United States Patent [19]

Thompson

[11] 4,331,770

[45] May 25, 1982

[54] LOW LIQUIDUS GLASSES FOR TELEVISION TUBE FACEPLATES

[75] Inventor: David A. Thompson, Horseheads, N.Y.

[73] Assignee: Corning Glass Works, Corning, N.Y.

[21] Appl. No.: 141,960

[22] Filed: Apr. 21, 1980

[51] Int. Cl.$^3$ .............................................. C03C 3/10
[52] U.S. Cl. ........................................ 501/62; 313/480; 501/64; 501/57; 501/70; 501/72
[58] Field of Search .................... 106/53; 313/480; 501/62, 64, 57, 70, 71, 72

[56] References Cited

U.S. PATENT DOCUMENTS

| | | | |
|---|---|---|---|
| 3,464,932 | 9/1969 | Connelly et al. | 252/478 |
| 4,065,697 | 12/1977 | Steierman | 313/480 |
| 4,179,638 | 12/1979 | Boyd et al. | 106/53 X |

FOREIGN PATENT DOCUMENTS

| | | | |
|---|---|---|---|
| 2433752 | 1/1976 | Fed. Rep. of Germany | 106/53 |
| 50-87405 | 7/1975 | Japan | 313/480 |
| 51-71314 | 6/1976 | Japan | 106/53 |
| 303854 | of 1971 | U.S.S.R. | 106/53 |

*Primary Examiner*—Helen M. McCarthy
*Attorney, Agent, or Firm*—Clinton S. Janes, Jr.

[57] ABSTRACT

The instant invention is directed to faceplate glasses for television picture tubes which, because they are essentially free from MgO, have liquidus temperatures below 800° C. Such glasses consist essentially, in weight percent on the oxide basis, of:

| | | |
|---|---|---|
| | $SiO_2$ | 58–65 |
| | $Al_2O_3$ | 1–3 |
| | CaO | 1–4 |
| | SrO | 6–12 |
| | BaO | 2–9 |
| | PbO | 1–3 |
| | $Na_2O$ | 5–9 |
| | $K_2O$ | 5–12 |
| $Na_2O + $ | $K_2O$ | 14–18 |
| | $TiO_2$ | 0.3–1 |
| | $CeO_2$ | 0.05–0.5 |

2 Claims, No Drawings

LOW LIQUIDUS GLASSES FOR TELEVISION TUBE FACEPLATES

BACKGROUND OF THE INVENTION

Basically, a television picture tube consists of an electron emitting means and a surrounding envelope comprising a funnel portion and a viewing faceplate. The faceplate is fabricated from a transparent glass having a composition which is highly absorptive of X-radiation and strongly resistant to discoloration resulting from the impingement of X-radiation and high velocity electrons thereupon.

U.S. Pat. No. 2,477,329 taught the inclusion of $CeO_2$ in glass compositions designed for use as television picture tube faceplates to inhibit discoloration of "browning" caused by X-radiation and the essential exclusion of readily-reducible oxides, specifically noting PbO, to minimize discoloration resulting from electron bombardment. The patent employed BaO as the primary X-radiation absorbing component.

U.S. Pat. No. 3,464,932 disclosed the utility of alkali metal silicate glasses containing SrO as the principal X-ray absorbing ingredient for the manufacture of television tube faceplates and, since the issuance of that patent, compositions containing substantial quantities of SrO have comprised the commercial standard for color television picture tube faceplates produced in the United States. The patent described glasses consisting essentially, in weight percent, of 4–20% $Na_2O+K_2O$ consisting of 0–10% $Na_2O$ and 0–10% $K_2O$, an effective amount up to 20% SrO, and 40–70% $SiO_2$, the sum of $Na_2O+K_2O+SrO+SiO_2$ constituting at least 70% of the total composition. The patent discloses the optional inclusions of up to 20% BaO, up to 15% total of CaO, MgO, and ZnO, up to 10% $Al_2O_3$, up to 10% $ZrO_2$, up to 2% F, up to 5% $B_2O_3$, up to 5% $P_2O_5$, and, while desirably absent, up to 3% PbO. Thus, excessive PbO can result in electron browning.

U.S. Pat. No. 3,805,107 was also directed to SrO-containing glasses suitable for use as television picture tube faceplates. In the commercial manufacture of such faceplates, fluorine had been included in the batch materials as a fluxing agent. Because of its volatilization during melting of the batch, however, air pollution in the vicinity of the melting unit became a recognized environmental problem. Accordingly, the patent delineated ranges of components which would yield glasses having melting and forming properties satisfactory for the production of faceplates while retaining the necessary physical characteristics required for that application. The patent also noted the complementary effect of $TiO_2$ with $CeO_2$ in inhibiting X-ray browning, disclosing the utility of up to 2% for that purpose. The glass compositions described consisted essentially, in weight percent of 5–20% SrO, 0–15% BaO, 5–20% SrO+BaO, 4–13% $K_2O$, 4–13% $Na_2O$, 8–20% $K_2O+Na_2O$, 0.2–2% $Li_2O$, 1.5–4% $Al_2O_3$, 0–5% CaO, 0–5% MgO, 0.25–2% $TiO_2$, 0.05–0.5% $CeO_2$, and the balance $SiO_2$.

U.S. Pat. No. 3,819,972 was drawn to SrO-containing glasses operable as faceplates for television picture tubes which statedly demonstrated superior working properties because the annealing points thereof were at least 550° C. Such high annealing points purportedly aided in the sealing operation when the faceplate was sealed to the funnel portion of the picture tube. The crux of the invention consisted in employing glasses containing more than 14% $K_2O$ and no more than 1.6% $Na_2O$. The compositions disclosed consisted essentially, in weight percent, of 45–70% $SiO_2$, 14–25% $K_2O$, 0–1.6% $Na_2O$, 0–6% $Al_2O_3$, 0–8% CaO, 0–3% MgO, 0–20% BaO, up to 20% SrO, 0–30% PbO, 0–2% $Li_2O$, 0–2% $F_2$, 0–2% MnO, 0–1% $TiO_2$, 0–1% $Sb_2O_3$, 0–1% $CeO_2$, and 0–1% rare earth oxides.

U.S. Pat. No. 3,925,089 described the use of certain feldspars and quartz sands as batch ingredients for making the funnel and faceplate portions of television picture tubes. The glass compositions prepared from the batches consisted essentially, in weight percent, of 50–75% $SiO_2$, 0.5–6% $Al_2O_3$, 0–5% CaO+MgO, $Li_2O+Na_2O+K_2O>13\%$, 0–1% $B_2O_3$, 0–15% PbO, 0–15% BaO, 0–8% $ZrO_2$, 0–12% SrO, $PbO+BaO+ZrO_2+SrO>8\%$.

U.S. Pat. No. 4,015,966 taught the production of SrO-containing glasses suitable for use as television picture tube faceplates which can be drawn as sheet on a bath of molten tin in accordance with the float glass process. The compositions disclosed consisted essentially, in weight percent, of 60–65% $SiO_2$, 0–5% $Al_2O_3$, 2–10% $Na_2O$, 0–17% $K_2O$, 2–10% CaO+MgO, 0–5% BaO, 5–15% SrO, 0–10% $ZrO_2$, 0–5% $WO_3$, 0–1% $TiO_2$, 0–1% $CeO_2$, 0.1–1% $TiO_2+CeO_2$, and 0–1% $Fe_2O_3$. The nub of the invention is stated to be the absence of PbO, $Sb_2O_3$, and $As_2O_3$ from the glass compositions, thereby eliminating reduction thereof in the non-oxidizing atmosphere demanded in the float glass process.

U.S. Pat. No. 4,065,697 described the preparation of SrO-containing glasses for use in television picture tubes. Operable glasses consisted essentially, in weight percent, of 45–70% $SiO_2$, 3–10% $Na_2O$, 5–15% $K_2O$, 0–6% $Al_2O_3$, 0–8% CaO, 0–3% MgO, 0–20% BaO, up to 15% SrO, 0–30% PbO, 0–2% $Li_2O$, 0–2% $F_2$, 0–2% MnO, 0–1% $TiO_2$, 0–1% $Sb_2O_3$, 0–1% $CeO_2$, and 0–1% rare earths. The preferred compositions consisted essentially, in weight percent, of 50–70% $SiO_2$, 3–10% $Na_2O$, 5–15% $K_2O$, up to 15% SrO, 3–5% $Al_2O_3$, 1–5% CaO, 0.1–20% BaO, 0.1–3% MgO, 0–2% $F_2$, and 0.1–5% PbO.

One problem that has plagued the melting and forming capabilities of SrO-containing glasses utilized in the production of television picture tube faceplates has been a relative high liquidus temperature, viz., greater than 800° C. and, frequently, in excess of 850° C. This circumstance has led to undesirably low liquidus viscosities from the standpoint of ease in forming glass shapes. Laboratory experimentation in seeking means for reducing the liquidus temperature has commonly resulted in substantial changes in other physical properties of the glass, in particular a reduction in the softening, annealing and strain points of the glass and/or a substantial variation in the coefficient of thermal expansion thereof.

OBJECTIVE OF THE INVENTION

Accordingly, the principal objective of the instant invention is to provide SrO-containing glasses suitable for use as faceplates for television picture tubes which demonstrate the physical properties demanded for that application and which exhibit a liquidus temperature below 800° C. and, preferably, below 750° C.

SUMMARY OF THE INVENTION

The SrO-containing glasses conventionally utilized commercially in the United States for the production of color television picture tube faceplates have been composed of about a dozen individual components in order to satisfy the melting and forming characteristics necessary to produce such products and the complex matrix of physical properties required to be exhibited thereby for that application. Hence, as presently defined, the glasses will demonstrate softening points between 685°–700° C., annealing points between 495°–515° C., strain points between 455°–475° C., coefficients of thermal expansion between $98$–$100 \times 10^{-7}/°C.$, log resistivity at 250° C. greater than 9 and log resistivity at 350° C. greater than 7, coupled with a linear X-ray absorption coefficient of 0.6 Å of at least 26 cm$^{-1}$ and good resistance to browning from X-radiation and electron bombardment. U.S. Pat. No. 3,805,107, supra, observed that the substitution of CaO or MgO for SiO$_2$ in the glass compositions disclosed therein tended to soften the glass and increase its electrical resistivity, both of which are desirable features. The patent also warned, however, that substantial amounts of those oxides, i.e., more than 5% individually and 10% collectively, should be avoided because of their tendency to significantly raise the liquidus temperature of the glass. Because of the favorable effects produced by CaO and MgO, they have been conventionally incorporated into the commercial compositions in amounts up to 3% CaO and up to 2% MgO, the total collectively being less than 5%. The oxides have customarily been added to the batch via relatively inexpensive dolomite or dolomitic limestone. Two examples of such glasses which have been marketed by Corning Glass Works, Corning, NY, under Codes 9040 and 9068 are reported below in approximate weight percent along with various physical properties and liquidus temperature. (The NiO, Co$_3$O$_4$, and Cr$_2$O$_3$ perform their customary function as colorants.)

|  | 9040 | 9068 |
|---|---|---|
| SiO$_2$ | 63.53 | 63.20 |
| Al$_2$O$_3$ | 3.40 | 2.00 |
| Na$_2$O | 7.5 | 7.10 |
| K$_2$O | 9.5 | 8.75 |
| CaO | 2.30 | 1.75 |
| MgO | 0.40 | 0.85 |
| Li$_2$O | — | 0.05 |
| PbO | — | 2.25 |
| BaO | 0.15 | 2.35 |
| SrO | 11.16 | 10.15 |
| TiO$_2$ | 0.53 | 0.50 |
| CeO$_2$ | 0.20 | 0.15 |
| As$_2$O$_3$ | 0.20 | 0.20 |
| Sb$_2$O$_3$ | 0.43 | 0.43 |
| F | 0.70 | 0.27 |
| NiO | 0.02089 | 0.00035 |
| Co$_3$O$_4$ | 0.00261 | 0.00037 |
| Cr$_2$O$_3$ | — | 0.00117 |
| Softening Point | 688° C. | 688° C. |
| Annealing Point | 503° C. | 503° C. |
| Strain Point | 462° C. | 462° C. |
| Log ρ 250° C. | — | 9.3 |
| Log ρ 350° C. | 7.3 | 7.4 |
| Expansion (0°–300° C.) | $99 \times 10^{-7}/°C.$ | $99 \times 10^{-7}/°C.$ |
| Liquidus | 847° C. | 850° C. |
| X-ray Absorption Coef. | 23.4 | 28.7 |

I have discovered a range of compositions having the necessary physical properties for use as television picture tube faceplates and which demonstrate a liquidus temperature below 800° C. The required components therefor consist essentially, in weight percent on the oxide basis, of:

| SiO$_2$ | 58–65% |
|---|---|
| Al$_2$O$_3$ | 1–3 |
| CaO | 1–4 |
| SrO | 6–12 |
| BaO | 2–9 |
| PbO | 1–3 |
| Na$_2$O | 5–9 |
| K$_2$O | 5–12 |
| Na$_2$O + K$_2$O | 14–18 |
| TiO$_2$ | 0.3–1 |
| CeO$_2$ | 0.05–0.5 |

As$_2$O$_3$ and/or Sb$_2$O$_3$ will commonly be present in amounts not exceeding about 1% total to perform their customary function as fining agents. Colorants such as the NiO, Co$_3$O$_4$, and Cr$_2$O$_3$ utilized in the above-cited commercial glasses may also be included. Fluoride in amounts not exceeding about 1.5% and Li$_2$O in amounts not exceeding about 1% may be tolerated by their fluxing action requires manipulation of the other components to bring the physical properties back into line.

The vital feature of the present invention is the essential absence of MgO from the compositions. As will be illustrated below, the removal of MgO from the above-cited ranges of composition causes very minor shifts in the physical properties displayed thereby but exerts a profound effect in reducing the liquidus temperatures thereof.

In the most preferred compositions, the mole ratio BaO:BaO+SrO will range about 0.45–0.65.

DESCRIPTION OF THE PREFERRED EMBODIMENTS

The following table records several glass compositions, expressed in terms of parts by weight on the oxide basis as calculated from the batch, illustrating the parameters of the invention. Inasmuch as the sum of the individual components totals or essentially totals 100, for all practical purposes the tabulated values can be deemed to reflect weight percent. The actual batch ingredients may comprise any materials, either the oxide or other compound, which, when melted together with the other constituents, will be converted into the desired oxide compositions in the proper proportions. The table also includes values of softening point (Soft.), annealing point (Ann.), and strain point (Str.), all in terms of °C., logarithm of the electrical resistivity (Log ρ) at 250° C. and 350° C., coefficient of thermal expansion between 0°–300° C. (Exp.) expressed in terms of $\times 10^{-7}/°C.$, linear X-ray absorption coefficient at 0.6 Å (LAC) in terms of cm$^{-1}$, and the internal liquidus temperature (Liq.) in °C. The recorded figures were obtained employing measuring techniques conventional in the glass art. The internal liquidus temperature was determined utilizing a platinum boat in a temperature gradient furnace.

The batch ingredients were compounded, mixed together to assist in achieving a homogeneous melt, and then deposited into platinum crucibles. The crucibles were moved to a furnace operating at about 1550° C., maintained therewithin for about four hours, the molten batches being stirred occasionally, the melts thereafter poured into steel molds to form glass slabs of about 6"×6"×1", and the slabs immediately transferred to an annealer operating at about 525° C. Samples of the proper dimensions were then cut from the slabs for physical property measurements.

Examples 9 and 10 reflect Corning Code 9068 glass, supra, without the colorants, NiO, Co₃O₄, and Cr₂O₃, and with changes in SiO₂ and MgO contents.

TABLE

|  | 1 | 2 | 3 | 4 | 5 | 6 | 7 | 8 | 9 | 10 |
|---|---|---|---|---|---|---|---|---|---|---|
| $SiO_2$ | 59.82 | 60.71 | 61.21 | 61.71 | 62.94 | 63.29 | 63.54 | 63.79 | 64.05 | 62.35 |
| $Al_2O_3$ | 1.5 | 1.5 | 1.5 | 1.5 | 1.50 | 1.50 | 1.50 | 1.50 | 2.00 | 2.00 |
| CaO | 2.76 | 2.76 | 2.76 | 2.76 | 1.85 | 1.85 | 1.85 | 1.85 | 1.75 | 1.75 |
| SrO | 7.0 | 7.0 | 7.0 | 7.0 | 10.15 | 10.15 | 10.15 | 10.15 | 8.75 | 8.75 |
| BaO | 7.65 | 7.65 | 7.65 | 7.65 | 2.35 | 2.35 | 2.35 | 2.35 | 2.35 | 2.35 |
| PbO | 2.94 | 2.94 | 2.94 | 2.94 | 2.37 | 2.37 | 2.37 | 2.37 | 2.25 | 2.25 |
| $Li_2O$ | — | — | — | — | 0.27 | 0.27 | 0.27 | 0.27 | 0.05 | 0.05 |
| $Na_2O$ | 7.37 | 7.37 | 7.37 | 7.37 | 6.33 | 6.33 | 6.33 | 6.33 | 7.10 | 7.10 |
| $K_2O$ | 7.82 | 7.82 | 7.82 | 7.82 | 10.14 | 10.14 | 10.14 | 10.14 | 8.75 | 8.75 |
| $TiO_2$ | 0.5 | 0.5 | 0.5 | 0.5 | 0.5 | 0.5 | 0.5 | 0.5 | 0.5 | 0.5 |
| $CeO_2$ | 0.15 | 0.15 | 0.15 | 0.15 | 0.15 | 0.15 | 0.15 | 0.15 | 0.15 | 0.15 |
| $As_2O_3$ | 0.2 | 0.2 | 0.2 | 0.2 | 0.2 | 0.2 | 0.2 | 0.2 | 0.2 | 0.2 |
| $Sb_2O_3$ | 0.4 | 0.4 | 0.4 | 0.4 | 0.4 | 0.4 | 0.4 | 0.4 | 0.43 | 0.43 |
| MgO | 1.89 | 1.0 | 0.5 | 0 | 0.85 | 0.5 | 0.25 | 0 | 0 | 1.7 |
| Soft. | 697 | 691 | 691 | 691 | 690 | 690 | 688 | 688 | 685 | 689 |
| Ann. | 516 | 513 | 511 | 510 | 504 | 505 | 504 | 497 | 503 | 503 |
| Str. | 475 | 470 | 468 | 468 | 461 | 464 | 460 | 455 | 467 | 459 |
| Log$\rho$ 250° | 9.530 | 9.435 | 9.445 | 9.395 | 9.565 | 9.530 | 9.515 | 9.530 | 9.180 | 9.270 |
| Log$\rho$ 350° | 7.620 | 7.565 | 7.540 | 7.500 | 7.615 | 7.590 | 7.570 | 7.580 | 7.300 | 7.385 |
| Exp. | 99.3 | 99.2 | 99.3 | 99.4 | 99.7 | 99.7 | 99.0 | 99.3 | 98.3 | 99.3 |
| LAC | 29.7 | 30.0 | 29.9 | 29.9 | 28.6 | 28.9 | 28.9 | 29.1 | 29.1 | 29.2 |
| Liq. | 831 | 811 | 696 | <625 | 868 | 821 | 797 | 769 | <700 | 886 |

An examination of the table clearly illustrates the effect which even a minor amount of MgO has upon the liquidus temperature of glass compositions within the inventive ranges which manifest physical properties recommending their utility for television picture tube faceplates. The elimination of MgO from the glass compositions has suggested the use of the minerals aragonite and limestone as batch materials for incorporating CaO into the batch since the impurity level of MgO therein is very low.

I claim:

1. A glass suitable for the faceplate of a television picture tube having a softening point between 685°–700° C., an annealing point between 495°–515° C., a strain point between 455°–475°, a coefficient of thermal expansion between 98–100×10⁻⁷/°C., a log resistivity at 250° C. greater than 9, a log resistivity at 350° C. greater than 7, a linear X-ray absorption coefficient at 0.6 Å of at least 26 cm⁻¹, good resistance to X-ray and electron browning, and a liquidus temperature below 800° C. consisting essentially, in weight percent on the oxide basis as calculated from the batch, of:

|  |  |
|---|---|
| $SiO_2$ | 58–65 |
| $Al_2O_3$ | 1–3 |
| CaO | 1–4 |
| SrO | 6–12 |
| BaO | 2–9 |
| PbO | 1–3 |
| $Na_2O$ | 5–9 |
| $K_2O$ | 5–12 |
| $Na_2O + K_2O$ | 14–18 |
| $TiO_2$ | 0.3–1 |
| $CeO_2$ | 0.05–0.5 | and being essentially free from MgO.

2. A glass according to claim 1 wherein the mole ratio BaO:BaO+SrO ranges about 0.45–0.65.

* * * * *